G. HAYES.

METALLIC SHUTTER.

No. 10,223. Reissued Oct. 24, 1882.

Witnesses.
Richard H. Rolle
Charles Hayes

Inventor.
George Hayes.

UNITED STATES PATENT OFFICE.

GEORGE HAYES, OF NEW YORK, N. Y.

METALLIC SHUTTER.

SPECIFICATION forming part of Reissued Letters Patent No. 10,223, dated October 24, 1882.

Original No. 173,786, dated February 22, 1876. Application for reissue filed September 29, 1882.

*To all whom it may concern:*

Be it known that I, GEORGE HAYES, of No. 71 Eighth avenue, in the city, county, and State of New York, have invented a new and useful improvement in panels for window-blinds, shutters, doors, screens, shades of railroad-cars, the inclosing of verandas, summer-houses, or any structure to which movable or stationary slats are applied; and I do hereby declare that the following is a full, clear, and exact description of the same, reference being had to the accompanying drawings, which form part of this specification.

This improvement is applicable to indoor and outdoor purposes, on buildings or structures of various kinds, including railroad-cars and ships; and in every instance where movable or stationary slats are now used this improvement has all the advantages, with none of the disadvantages, of wooden slats, that of not entirely shutting out light and ventilation, to exclude the direct rays of the sun, and to keep insects out of the building, and of having no movable parts, which so frequently get out of repair, while the same or greater advantages are secured as regards the cost and effect as are claimed for the blinds, shutters, &c., in my former application for patent made on the 11th of June, 1875. This device is intended to obstruct more fully the direct rays of the sun, and to shed the water during rain-storms, while sufficiently transmitting the indirect rays.

My improvement consists in perforating a metal plate in bands alternately—that is to say, I take the plate, and, instead of perforating the whole surface, I perforate it in bands half an inch in width, more or less, running from side to side, leaving a plain space between each band of similar width. I then suitably corrugate or step the plates so perforated in such a manner that the space between the perforated bands will be uppermost and at an angle that will wholly or in part shield from the direct rays of the sun and rain the perforated openings.

I do not bind myself to any particular pattern of perforation, or to any particular shape of the corrugation.

Figure 2:
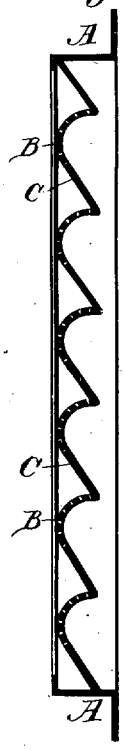
Figure 1:
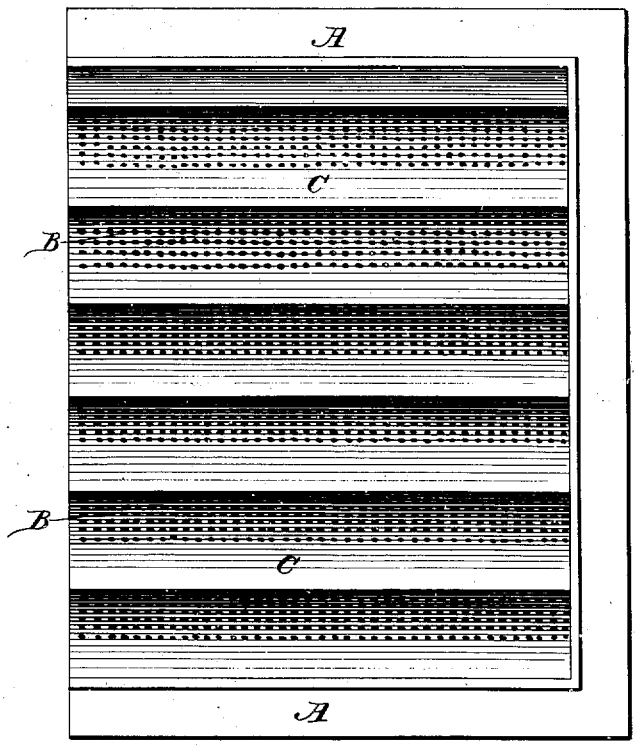

Referring to the accompanying drawings, Figure 1 represents a front view of a panel. Fig. 2 represents a vertical section of same, showing the panel in one piece.

Similar letters of reference indicate corresponding parts.

A represents the frame to which the panels are attached; B, the perforated bands; C, the blank portions between the perforated bands.

What is here claimed, and desired to be secured by Letters Patent, is—

A metallic plate or panel in one piece, perforated in bands and corrugated or stepped in the manner described, and for the purpose herein set forth.

GEORGE HAYES.

Witnesses:

RICHARD H. REILLE,

CHARLES HAYES.